UNITED STATES PATENT OFFICE.

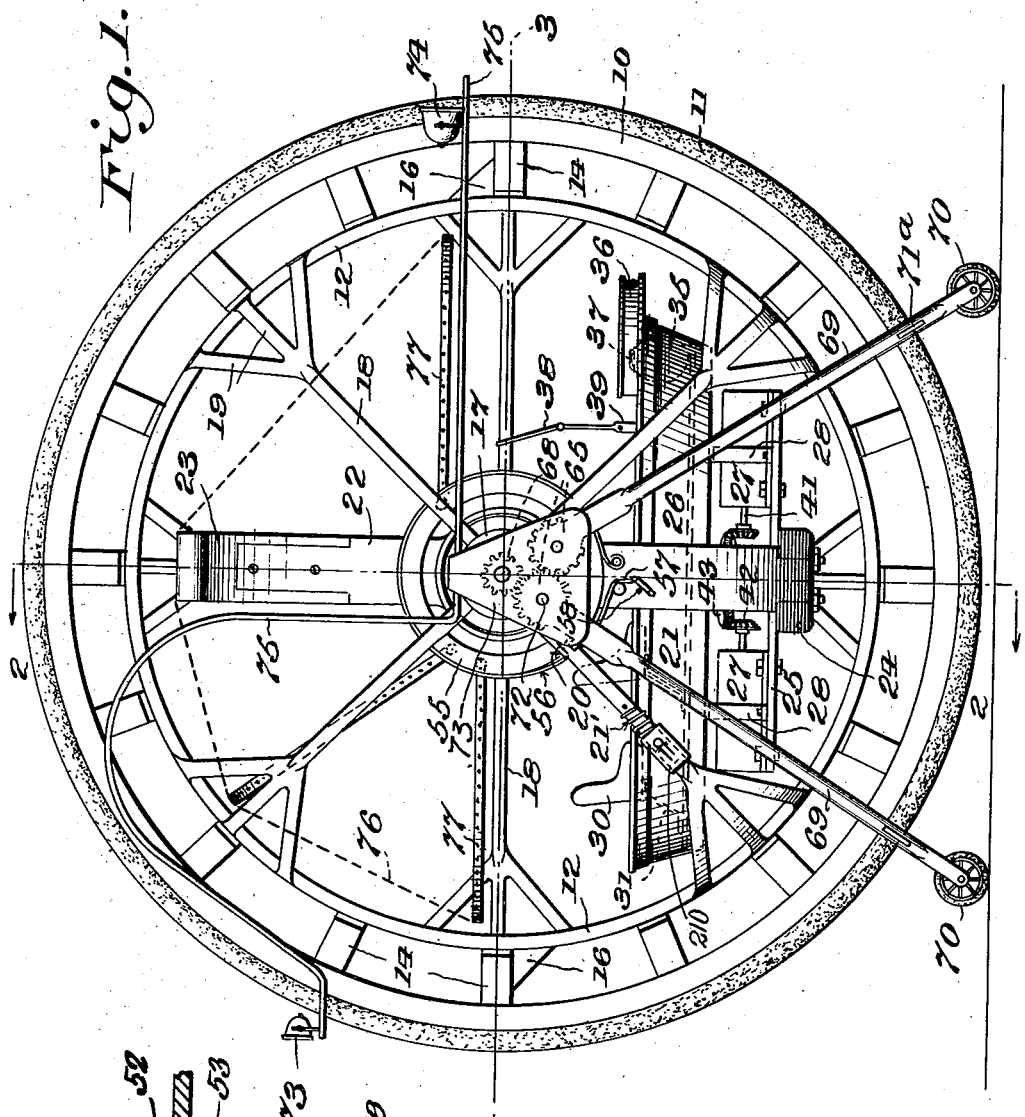

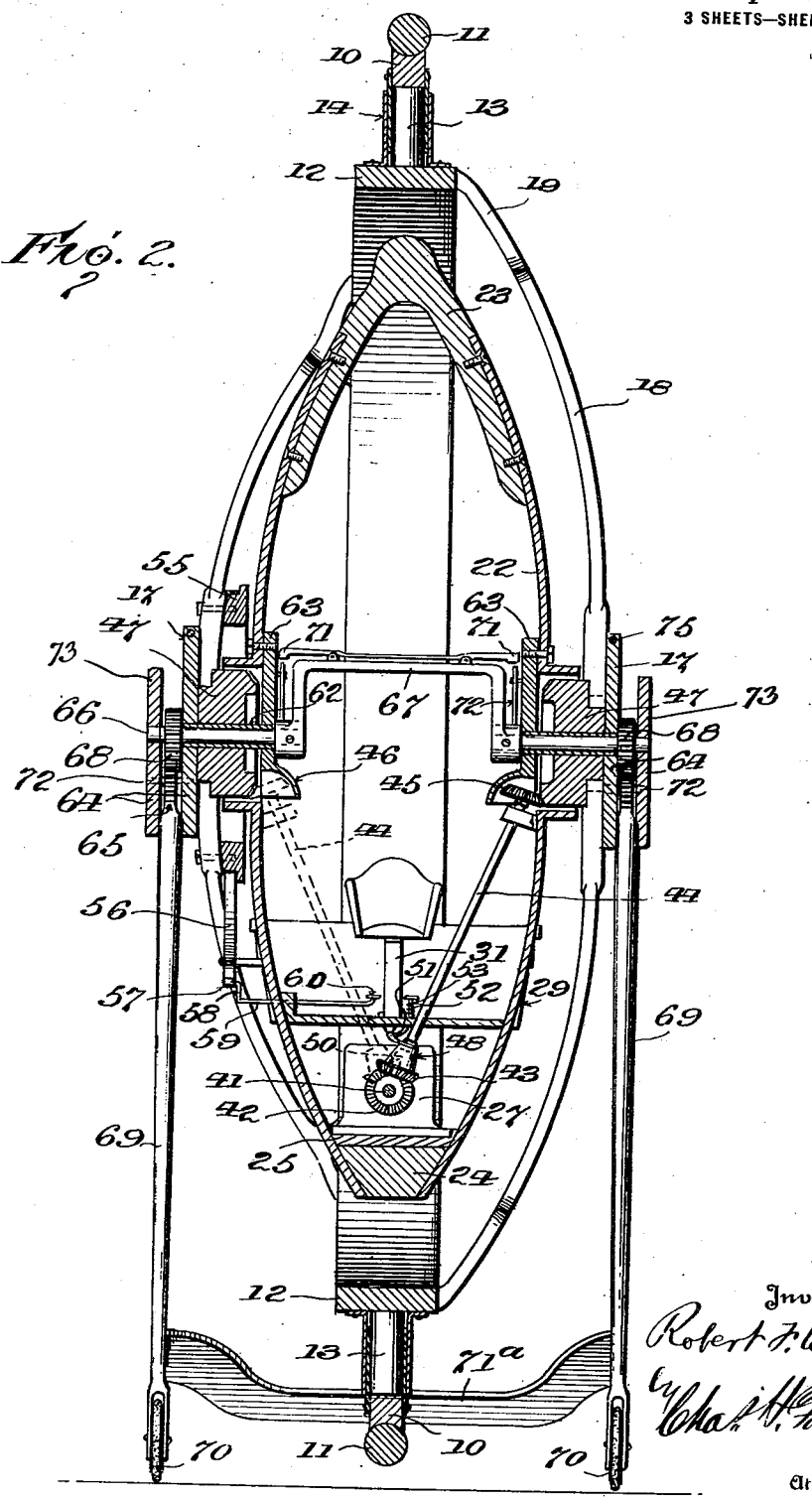

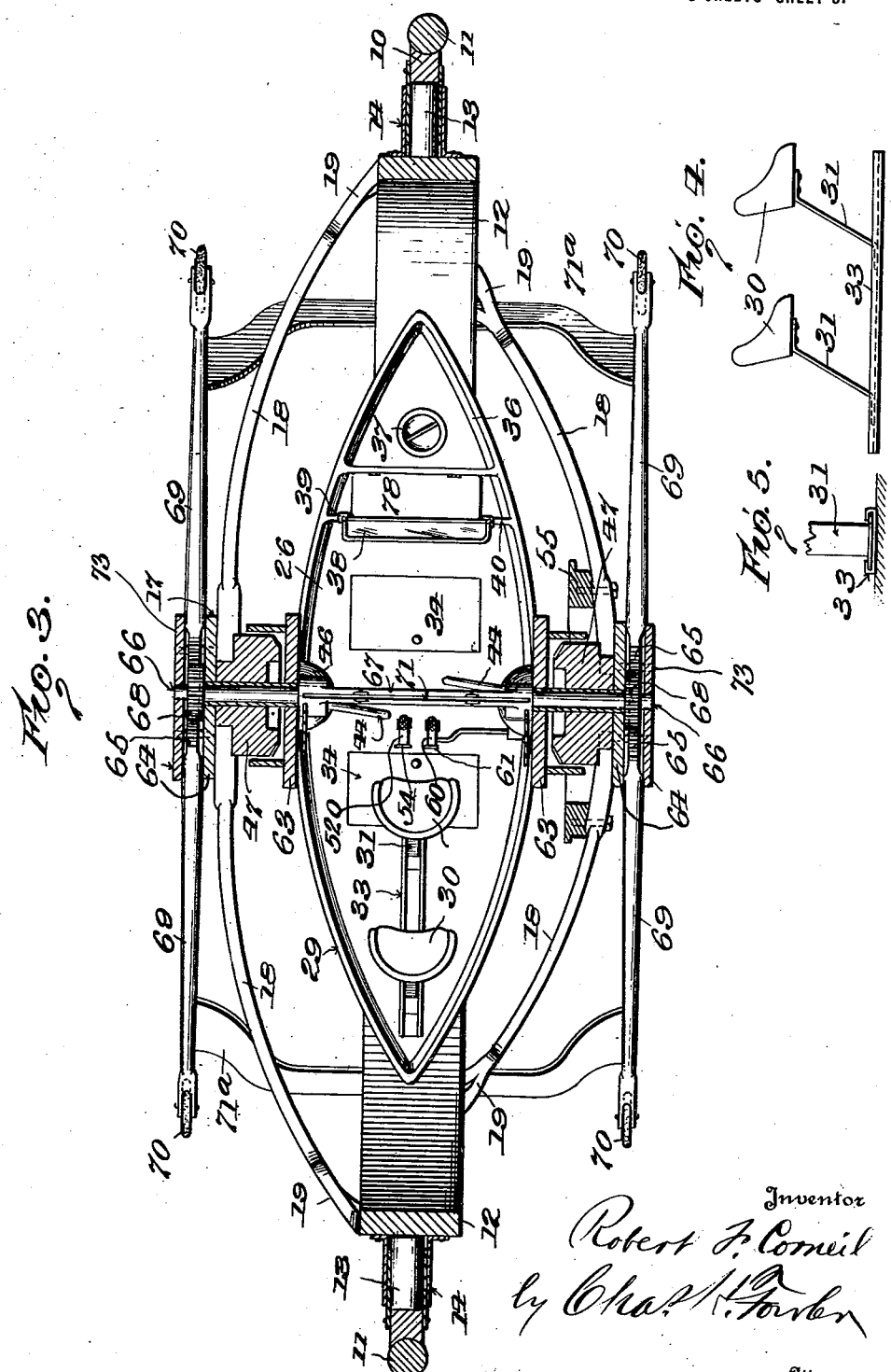

ROBERT F. CORNEIL, OF SAN DIEGO, CALIFORNIA, ASSIGNOR OF ONE-FOURTH TO HARLEY CLEMENT SCOVEL, OF SAN DIEGO, CALIFORNIA.

UNICYCLE.

1,240,678.  Specification of Letters Patent.  Patented Sept. 18, 1917.

Application filed October 5, 1916. Serial No. 123,980.

*To all whom it may concern:*

Be it known that I, ROBERT F. CORNEIL, a citizen of the United States, residing at San Diego, in the county of San Diego and State of California, having invented certain new and useful Improvements in Unicycles, and do hereby declare that the following is a full, clear, and exact description of the same, reference being had to the annexed drawings, making a part of this specification, and to the letters and figures of reference marked thereon.

The object of my invention generally stated is to provide a motor driven unicycle which will be as simple in construction as is consistent with such a vehicle, will be commodious and comfortable for the passengers, and will be capable of convenient and easy control.
To this end my invention consists in the unicycle having the characteristics of construction substantially as hereinafter specified and claimed.

In the accompanying drawings which illustrate one embodiment of my invention—

Figure 1 is a view of the same in side elevation;

Fig. 2 is a vertical section on the line 2—2 of Fig. 1;
Fig. 3 is a horizontal section on the line 3—3 of Fig. 1;

Figs. 4 and 5 are detail views of the seat supports.

In constructing a unicycle in accordance with my invention in what I now regard as the most desirable construction, which is that illustrated in the drawings, the single carrying and driving wheel 10 has a diameter from 72" to 96 inches and the greatest width of wheel and the frame parts outside of the same from 30" to 36 inches. The wheel rim is grooved on its outer periphery to receive a preferably solid rubber tire 11. The rim can be of wood or metal and of any kind that the builder may prefer to use.

Spaced apart from but concentric with the rim 11 is an inner rim 12 and a yielding connection is provided between the inner and outer rims which consists of a circular series of cushioning device each comprising a two-part telescopic sleeve and a cushion device within the sleeve. Said cushion device may be either a coil spring, or as shown in the drawings a block of rubber 13 which reaches radially from one rim to the other and the sleeve consists of a flat-sided tube 14 open on one side which is attached at one end to the inner rim and a similar flat-sided tube 15 which is attached at its end to the outer rim and extends radially inward and the two tubes are placed together so that the open sides of the tubes on the respective rims face in the same direction which is the direction of rotation of the wheel. The purpose of this open-sided construction and arrangement is to enable the ready separation of the inner and outer rim which may be accomplished merely by rotating one rim with reference to the other.
Normally, one or more stops 16 attached to the outer side of the inner rim so as to engage the closed side of a tube of the outer rim prevents relative independent turning of one rim with reference to the other and such stop is detachably secured to permit the same to be removed when necessary. The tube sections of a coöperating pair are each shorter than the cushion device to allow relative radial movement of the rims. Radiating from two widely spaced hubs 17 to the inner rim are a number of spokes 18, preferably an even number, on each side of the wheel and the spokes on the opposite sides being arranged staggering and the spokes bend or curve inward from the hubs to the inner rim which is much narrower than the distance between the two hubs. Each spoke near its outer end has a pair of outwardly diverging brace arms 19 which reach to the inner rim and thus a strong light and graceful looking construction is provided. One of the spokes is preferably jointed by a hinge 20 near its hub and is separated toward its outer end so that the jointed portion may be swung out of the way to enable the user or passenger to get readily into and out of the car 21 which is supported inside the wheel. To provide a strong joint between the outer end of the hinged part of the spoke and the stationary portion attached to the inner rim, I interlock the same by a dove-tail joint, and a sliding sleeve 210 is carried by said pivoted part of the spoke which normally overlaps said dove-tail joint and thus rigidly holds the two parts of the spoke in alinement. A coil spring 21' acting on said sleeve presses it normally into spoke locking position.

For suspending the car and the rest of the equipment, I provide a frame which consists of two outwardly bowed bars 22 which are respectively mounted on the two hubs above and below each and joined at their top by a forked block 23 the arms of which are recessed on their outer sides to receive the upper portions of said bars which are bolted thereto; while their lower ends are inserted in recesses in the opposite sides of a base block 24 to which they are bolted and to said base block is bolted an engine bed 25 which extends symmetrically front and back from said arm. The car floor or platform 26 is supported above the engine bed a sufficient distance to accommodate the two engines 27, which are gasolene engines, by means of a suitable number of uprights or standards 28 which are bolted to and rise from the engine bed.

The platform or floor 26 which is canoe-shaped has a marginal wall or projection 29 on its sides to add to the appearance and to serve the purpose of preventing objects on the platform from falling therefrom into the wheel. Preferably two seats similar to the seat 30, one for the driver and another for a passenger are mounted on the floor or platform and the seat is supported by a curved spring arm 31 which at its bottom has a horizontal extension or foot that is slidable back and forth in the guides 33 secured to the floor for adjusting its position. The floor has preferably two trap doors 34 for giving access through the floor to the engines beneath.

At its front end the floor supports a gasolene tank 35 which is protected on sides and front by an upstanding flange 36. A suitable removable cover 37 is provided for the tank. Also mounted upon the floor and in the forward part of the car there is a windshield 38 composed of two hinged or jointed sections, the lower one of which has at each side, a forked leg 39 adapted to slip over a cross bar 40 so as to be detachably mounted in position.

There are two engines which are located, one forward and the other rearward of the wheel axis in order to provide a balanced construction. Each of these engines has a horizontal shaft 41 which at its end toward the center of the wheel is provided with a bevel pinion 42 that meshes with a bevel pinion 43 on the lower end of a vertical shaft 44 that passes upward through car, the floor, or platform and at its upper end has a bevel gear 45 which is fixed to the shaft whereas the bevel gear on the lower end of the shaft is loose thereon. The bevel pinion on the upper end of the shaft is covered by a housing 46 for the purpose of protection. The vertical shafts extend upward to opposite sides of the wheel and they are journaled in bearings that are attached to the suspension bars 22. The bevel gears on the upper end of the shafts, respectively, mesh with bevel gears 47 that respectively, encircle the hubs 17 and are attached thereto and thus are attached to the carrying and driving wheel 10. Each loose bevel gear on the lower end of the shaft has a tapering hub or collar 48 and splined to the shaft adjacent said hub is a sleeve 49 having in its end toward the hub a correspondingly tapering cavity 50 so that by sliding the sleeve to place its tapering cavity tight on the hub of the gear wheel the latter is clutched to the shaft and by a reverse movement may be unclutched therefrom. Thus the engines may be connected and disconnected from the driving wheel of the unicycle. Each sleeve has an annular groove in its outer side which is engaged by the forked end of an arm 51 which is attached to a vertical post 52 that slidably passes through a hole in the car floor and at its upper end is pivoted to a treadle 520, the treadle is acted upon by a spring 53 that causes a downward movement of the sleeves to engage them with their bevel gear hubs and a spring latch 54 is provided on the floor near the free end of the treadle to catch the latter when it is depressed to disengage the clutches to hold the treadle in such position. Thus, the running of the engines may continue even though the unicycle may be stopped and stationary.

Connected to the main wheel at one side thereof on the inner side of the spokes is a brake drum 55 which is encircled by an expanding spring strap 56, one end of which is attached to the adjacent suspending bar 22 while the other end is attached by a link 57 to a crank 58 on a horizontal rock shaft 59 to which is attached a treadle 60 for convenient operation by the driver. On depressing the treadle the brake will be applied and the treadle may be locked in this position by a spring catch 61 similar to the latch 54 for the clutch treadle 520 which engages the heel of the treadle.

The wheel axle is formed by two similar sleeves 62 which pass through the wheel hubs and on the inner end of each sleeve is a plate 63 while on its outer end is a plate 64. Passing through each sleeve is a shaft or spindle 66 to the inner end of which is connected a crank 67 while on its outer end is a pinion 68 which meshes with two gear segments 65 on the upper ends, respectively, of a pair of legs 69 which have a length greater than the radius of the main wheel and that on their outer ends carry each a caster wheel 70 and the corresponding legs of a pair on opposite sides of the unicycle are connected by a cross bar 71ª.

It will be seen that by swinging the crank 67 the legs of a pair may be swung toward and from each other and thus be placed in position where they will support the unicycle in front and in rear of the bottom of the main wheel, or may be placed in a position to be entirely clear of the ground. The upper ends of the legs of a pair are mounted on pivots 72 which extend from a plate 73 on the outer side to the plate 64 and said outer plate thus serves as a cover for the gear segments and the wheel 68 meshing therewith. Mounted on the crank 67 are two oppositely extending connected latches 71 which, respectively, are adapted to coöperate with spaced notches in quadrant plates 72 bolted to the inner side of the plate 63 and thus the legs can be locked in the desired positions. The two latches are connected by a spring middle portion so that by grasping the crank and at the same time said elastic middle portion both latches will be rocked on their pivotal connections with the crank to disengage them from the quadrant notches. The normal tendency of the spring middle connecting portions of the two latches is to place them into engagement with the quadrant notches.

A tail light 73 and two headlights 74, one at each side of the wheel, are mounted on a light frame 75 which may be composed of tubing which is bent to shape so as to extend on both sides of the wheel from front to rear. They carry wires within them from a battery if the lamps are electric, but, of course, the lamps need not be electric. Said frame at each side is supported by being set in a recess or groove in the upper side of the outer sleeve plate 64.

For the support of a suitable cover 76 (shown in dotted lines on the drawing) I provide a number of bows 77, each of which is a V-shaped frame which at its free separated end is pivotally connected to the inner sleeve plate 63 so that said bows may be swung out of position when not in use. In the space between the windshield and the gasolene tank, I provide a tool box 78.

I explain with much detail the construction shown in the drawing as one embodiment of my invention but it will be understood that the principle of my invention is not restricted to any special details of construction and relative arrangements of parts and, therefore, it is to be understood that my invention extends to and comprehends other constructions which may properly fall within the scope of the claims.

Having thus described my invention what I claim is

1. In combination with the carrying wheel of a unicycle, an engine, gearing between the engine and said wheel, a car suspended within the wheel comprising a horizontally extending platform that reaches in front and in rear of a plane passing vertically through the wheel axis and having storage space in its forward part, and a driver seat in its rear part, and means mounted on the car for controlling the running of the unicycle by the engine.

2. In combination with the carrying wheel of a unicycle, an engine, gearing between the engine and said wheel, a car suspended within the wheel comprising a horizontally extending platform that reaches in front and in rear of a plane passing vertically through the wheel axis and having storage space in its forward part, and a driver seat in its rear part, and means mounted on the car for controlling the running of the unicycle by the engine, said engine being situated beneath the car.

3. In combination with the carrying wheel of a unicycle, a car supported within the wheel, an engine bed below the car, a plurality of engines on the bed in a balanced arrangement with reference to a plane passing vertically through the wheel axis shafts driven from the engines extending front and back and situated in a plane at the transverse center of the wheel, driving wheels concentric with wheel axis on opposite sides of the transverse center of the wheel, and gearing, including two upwardly extending shafts, connecting said engine shafts with said driving wheels.

4. In a unicycle, the combination of a carrying wheel having concentric spaced outer and inner rims situated in substantially the same vertical planes, means yieldingly connecting said rims, a pair of wheel hubs, spokes in sets on opposite sides of the wheel which incline from the hub to the inner rim, and a car supported within the wheel between the sets of spokes.

5. In a unicycle, the combination of a main carrying wheel, a pair of alining sleeves on which the wheel is mounted to revolve, a car supported within the wheel, a motor suspended within the wheel below the car, gearing between the motor and the wheel, a spindle passing through each of said sleeves, a crank connecting the spindle within the wheel, pivoted legs outside the wheel, and gearing between the spindle and said legs.

6. In a unicycle, the combination of a main carrying wheel, a pair of alining sleeves on which the wheel is mounted to revolve, a car supported within the wheel, a motor suspended within the wheel below the car, gearing between the motor and the wheel, a spindle passing through each of said sleeves, a crank connecting the spindle within the wheel, pivoted legs outside the wheel, and gearing between the spindle and said legs, a plate on the outer end of each sleeve, and a lamp carrying frame secured to said plate.

7. In a unicycle, the combination of a main carrying wheel, a pair of alining sleeves on which the wheel is mounted to revolve, a car supported within the wheel, a motor suspended within the wheel, below the car, gearing between the motor and the wheel, a spindle passing through each of said sleeves, a crank connecting the spindle within the wheel, pivoted legs outside the wheel, gearing between the spindle and said legs, a plate on the inner end of each sleeve, and cover supporting bows attached to said plate.

In testimony whereof I affix my signature in presence of two witnesses.

ROBERT F. CORNEIL.

Witnesses:
M. J. RARIDAN,
MARY B. MACKRILL.